US012657100B2

(12) United States Patent
Kitagawa

(10) Patent No.: US 12,657,100 B2
(45) Date of Patent: Jun. 16, 2026

(54) MEMORY DEVICE WITH INDEPENDENT PLATE LINE CONTROL

(71) Applicant: Micron Technology, Inc., Boise, ID (US)

(72) Inventor: Makoto Kitagawa, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 162 days.

(21) Appl. No.: 18/442,704

(22) Filed: Feb. 15, 2024

(65) Prior Publication Data

US 2024/0281351 A1 Aug. 22, 2024

Related U.S. Application Data

(60) Provisional application No. 63/446,689, filed on Feb. 17, 2023.

(51) Int. Cl.
*G06F 11/273* (2006.01)
(52) U.S. Cl.
CPC ................................. *G06F 11/2733* (2013.01)
(58) Field of Classification Search
CPC .................................................. G06F 11/2733
See application file for complete search history.

(56) References Cited

U.S. PATENT DOCUMENTS

| | | | |
|---|---|---|---|
| 11,307,773 B1 * | 4/2022 | Ring | G06F 3/0614 |
| 2009/0122624 A1 * | 5/2009 | Nishida | G11C 29/84 |
| | | | 365/230.06 |
| 2012/0033515 A1 * | 2/2012 | Kyung | G11C 29/816 |
| | | | 365/200 |
| 2014/0369124 A1 * | 12/2014 | Moon | G11C 16/16 |
| | | | 365/185.11 |
| 2021/0142862 A1 | 5/2021 | Lovett et al. | |
| 2021/0165577 A1 * | 6/2021 | Sforzin | G06F 3/0616 |

\* cited by examiner

*Primary Examiner* — Raymond N Phan
(74) *Attorney, Agent, or Firm* — Schwegman Lundberg & Woessner, P.A.

(57) ABSTRACT

A memory device can include an array of memory cells comprising groups of memory cells, the groups including at least one redundant group for repairing a defective group. The memory device can include a controller coupled to the array. Responsive to receiving a memory access command, the controller can detect whether a defective group is present. If a defect is present, sensing operations are not performed for the defective group. If no defect is present, sensing operations are not performed for the redundant group.

20 Claims, 9 Drawing Sheets

700

702 — Provide time delay in response to memory access command

704 — Detect defective column

706 — Disable sensing for defective column or redundancy column

MEMORY DEVICE WITH INDEPENDENT PLATE LINE CONTROL

PRIORITY APPLICATION

This application claims the benefit of priority to U.S. Provisional Application Ser. No. 63/446,689, filed Feb. 17, 2023, which is incorporated herein by reference in its entirety.

FIELD OF THE DISCLOSURE

Embodiments of the disclosure relate generally to memory devices. More specifically, embodiments relate to sensing and programming of memory cells of a memory device.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), static RAM (SRAM), or synchronous dynamic random-access memory (SDRAM), among others. Non-volatile memory can retain stored data when not powered, and includes flash memory, read-only memory (ROM), electrically erasable programmable ROM (EEPROM), erasable programmable ROM (EPROM), resistance variable memory, such as phase-change random-access memory (PCRAM), resistive random-access memory (RRAM), magnetoresistive random-access memory (MRAM), or three-dimensional (3D) XPoint™ memory, among others. Power usage in memory devices and other electronic devices can be reduced using enhancements to defect sensing and handling of defective memory cells.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

The following detailed description refers to the accompanying drawings that show, by way of illustration, various embodiments that can be implemented. These embodiments are described in sufficient detail to enable those of ordinary skill in the art to practice these and other embodiments. Other embodiments can be utilized, and structural, logical, mechanical, and electrical changes can be made to these embodiments. The various embodiments are not necessarily mutually exclusive, as some embodiments can be combined with one or more other embodiments to form new embodiments. The following detailed description is, therefore, not to be taken in a limiting sense Some types of memory, for example ferroelectric RAM (FeRAM), utilize two separate operations in the performance of reading or writing functions. These two separate functions can each include sensing and programming operations that comprise setting different access lines (e.g., digit lines, plate lines, word lines) to relatively high or low levels, as described with reference to FIG. 1. Power is consumed during the sensing and programming operations, and inefficiency can be introduced when sensing and programming defective memory as described in more detail below.

Figure 1:
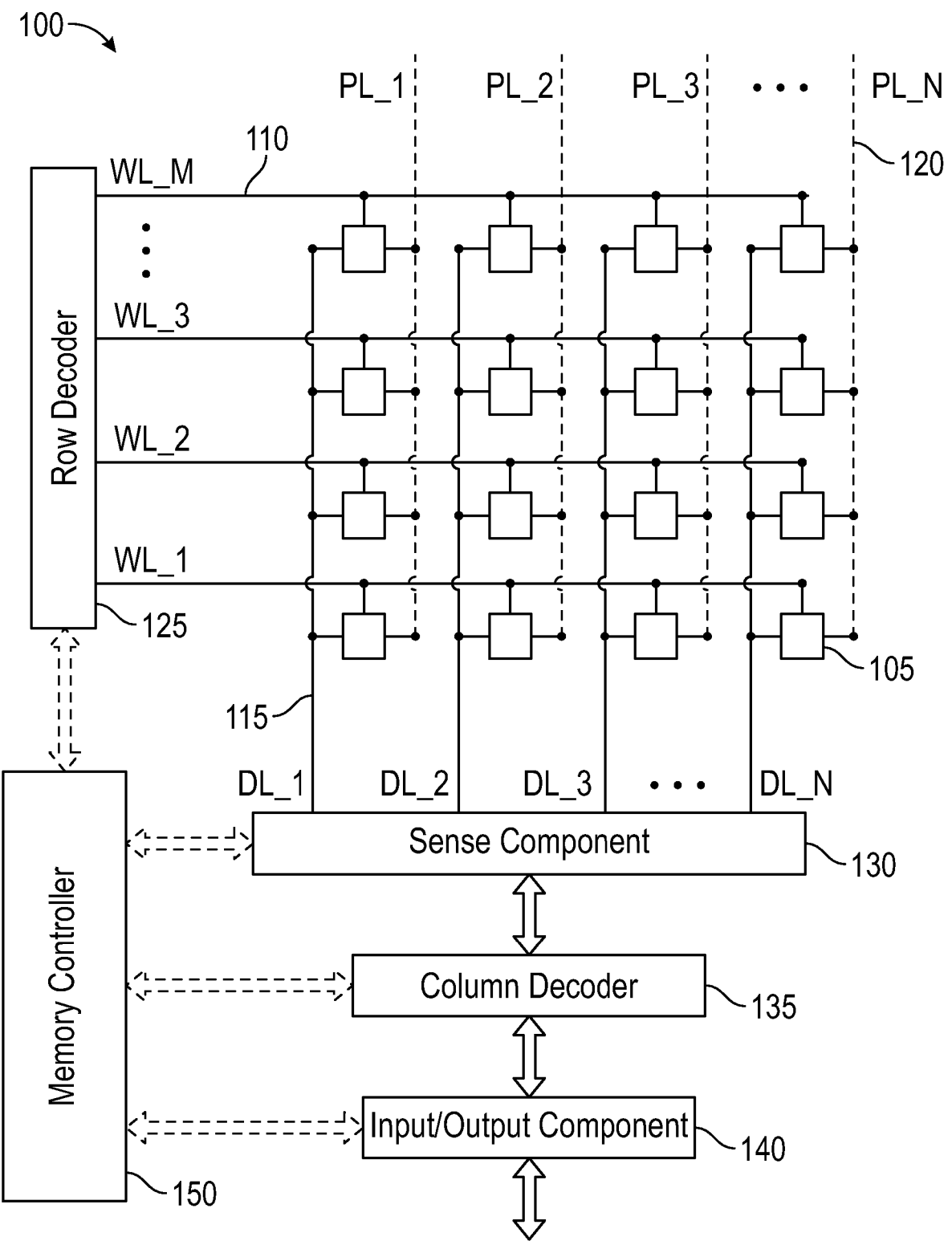
FIG. 1 illustrates an example of a system for operating a memory device in accordance with some examples of the present disclosure.

FIG. 1 illustrates an example memory device 100 in accordance with some examples of the present disclosure. Memory device 100 may also be referred to as an electronic memory apparatus or a memory array. Memory device 100 includes memory cells 105 that are programmable to store different logic states. In some cases, a memory cell 105 may be programmable to store two logic states, denoted a logic 0 and a logic 1. In some cases, a memory cell 105 may be programmable to store more than two logic states.

In some examples, a memory cell 105 may store an electrical charge representative of the programmable logic states in a capacitive memory element. For example, a charged and uncharged capacitor of a memory cell 105 may represent two logic states, respectively, or a positively charged and a negatively charged capacitor of a memory cell 105 may represent two logic states, respectively. DRAM architectures may commonly use such a design, and the capacitor employed may include a dielectric material with linear or para-electric electric polarization properties as the insulator. In some examples, such as FeRAM architectures, a memory cell 105 may include a ferroelectric capacitor having a ferroelectric material as an insulating layer between terminals of the capacitor. Different levels of polarization of a ferroelectric capacitor may represent different logic states (e.g., supporting two or more logic states in a respective memory cell 105). Ferroelectric materials have non-linear polarization properties including those discussed in further detail below with reference to FIG. 3.

According to the example of FIG. 1, each row of memory cells 105 is coupled with one of a plurality of first access lines 110 (e.g., a word line (WL)), and each column of memory cells 105 is coupled with one of a plurality of second access lines 115 (e.g., a digit line (DL)). Thus, one memory cell 105 may be located at the intersection of one of the first access lines 110 and one of the second access lines 115. This intersection may be referred to as an address of the memory cell 105. In some cases, first access lines 110 and second access lines 115 may be substantially perpendicular to one another in the memory device 100. References to word lines and bit lines, or their analogues, are interchangeable without loss of understanding or operation.

In general, one memory cell 105 may be located at the intersection of (e.g., coupled with, coupled between) an access line 110 and an access line 115. This intersection may be referred to as an address of a memory cell 105. A target memory cell 105 may be a memory cell 105 located at the intersection of an energized or otherwise selected access line 110 and an energized or otherwise selected access line 115. In other words, an access line 110 and an access line 115 may be energized or otherwise selected to access (e.g., read, write) a memory cell 105 at their intersection. Other memory cells 105 that are in electronic communication with (e.g., connected to) the same access line 110 or 115 may be referred to as untargeted memory cells 105.

Although the access lines described with reference to FIG. 1 are shown as direct lines between memory cells 105 and coupled components, access lines may include other circuit elements, such as capacitors, resistors, transistors, amplifiers, voltage sources, switching components, selection components, and others, which may be used to support access operations including those described herein. In some examples, an electrode may be coupled with (e.g., between) a memory cell 105 and an access line 110, or with (e.g., between) a memory cell 105 and an access line 115. The term electrode may refer to an electrical conductor, or other electrical interface between components, and in some cases, may be employed as an electrical contact to a memory cell 105. An electrode may include a trace, wire, conductive line, conductive layer, conductive pad, or the like, that provides a conductive path between elements or components of memory device 100.

In some architectures, the logic storing component (e.g., a capacitive memory element) of a memory cell 105 may be electrically isolated from a second access line 115 by a selection component. A first access line 110 may be coupled with and may control the selection component. For example, the selection component may be a transistor and the first access line 110 may be coupled with a gate of the transistor. Activating the first access line 110 may result in an electrical connection or closed circuit between the logic storing component of the memory cell 105 and its corresponding second access line 115. The second access line 115 may then be accessed to read and/or write the memory cell 105.

In some examples, memory cells 105 may also be coupled with one of a plurality of third access lines 120 (e.g., a plate line (PL)). In some examples, the plurality of third access lines may couple memory cells 105 with a voltage source for various sensing and/or writing operations including those described herein. For example, when memory cells 105 employ a capacitor for storing a logic state, a second access line 115 may provide access to a first terminal of the capacitor, and a third access line 120 may provide access to a second terminal of the capacitor. As used herein, the term "terminal" need not suggest a physical boundary or connection point of a capacitor of a memory cell 105. Rather, "terminal" may refer to a reference point of a circuit relevant to the capacitor of the memory cell, which may also be referred to as a "node" or "reference point." Although the plurality of third access lines 120 of the memory device 100 are shown as substantially parallel with the plurality of second access lines 115, in other examples a plurality of third access lines 120 may be substantially parallel with the plurality of first access lines 110, or in any other configuration.

Access operations such as reading, writing, and rewriting may be performed on a memory cell 105 by activating or selecting a first access line 110, a second access line 115, and/or a third access line 120 coupled with the memory cell 105, which may include applying a voltage, a charge, and/or a current to the respective access line. Access lines 110, 115, and 120 may be made of conductive materials, such as metals (e.g., copper (Cu), silver (Ag), aluminum (Al), gold (Au), tungsten (W), titanium (Ti), etc.), metal alloys, carbon, or other conductive materials, alloys, or compounds. Upon selecting a memory cell 105, a resulting signal may be used to determine the stored logic state. For example, a memory cell 105 with a capacitive memory element storing a logic state may be selected, and the resulting flow of charge via an access line and/or resulting voltage of an access line may be detected to determine the programmed logic state of the memory cell 105.

Accessing memory cells 105 may be controlled through a row decoder 125 and a column decoder 135. For example, a row decoder 125 may receive a row address from the memory controller 150 and activate the appropriate first access line 110 based on the received row address. Similarly, a column decoder 135 may receive a column address from the memory controller 150 and activate the appropriate second access line 115. Thus, in some examples a memory cell 105 may be accessed by activating a first access line 110 and a second access line 115.

In some examples, the memory controller 150 may control the operation (e.g., read operations, write operations, rewrite operations, refresh operations, discharge operations) of memory cells 105 through the various components (e.g., row decoder 125, column decoder 135, sense component 130). In some cases, one or more of the row decoder 125, column decoder 135, and sense component 130 may be co-located or otherwise included with the memory controller 150. The memory controller 150 may generate row and column address signals to activate a desired access line 110 and access line 115. The memory controller 150 may also generate or control various voltages or currents used during the operation of memory device 100. For example, the memory controller 150 may apply a discharge voltage to an access line 110 or an access line 115 after accessing one or more memory cells 105.

In general, the amplitude, shape, or duration of an applied voltage, current, or charge may be adjusted or varied, and may be different for the various operations discussed in operating the memory device 100. Further, one, multiple, or all memory cells 105 within memory device 100 may be accessed simultaneously. For example, multiple or all memory cells 105 of memory device 100 may be accessed simultaneously during a reset operation in which all memory cells 105, or a group of memory cells 105, are set to a single logic state.

A memory cell 105 may be read, or sensed, by a sense component 130. For example, sense component 130 may be configured to determine the stored logic state of a memory cell 105 based on a signal generated by accessing the memory cell 105. The signal may include a voltage, an electrical charge, an electrical current, or a combination thereof, and sense component 130 may include voltage sense amplifiers, charge sense amplifiers, current sense amplifiers, or both.

In some examples, a threshold current may be defined for sensing the logic state stored by a memory cell 105. The threshold current may be set above a current that may pass through the memory cell 105 when the memory cell 105 does not threshold in response to the read pulse, but equal to or below an expected current through the memory cell 105 when the memory cell 105 does threshold in response to the read pulse. For example, the threshold current may be higher than a leakage current of the associated access lines 110 or 115. In some examples, a logic state stored by a memory cell 105 may be determined based on a voltage (e.g., across a shunt resistance) resulting from the current driven by a read pulse. For example, the resulting voltage may be compared relative to a reference voltage, with a resulting voltage less than the reference voltage corresponding to a first logic state and a resulting voltage greater than the reference voltage corresponding to a second logic state.

A sense component 130 may include various switching components, selection components, transistors, amplifiers, capacitors, resistors, or voltage sources to detect and amplify a difference in sensing signals (e.g., a difference between a read voltage and a reference voltage, a difference between a read current and a reference current, a difference between a read charge and a reference charge), aspects of which, in some examples, may be referred to as latching. The detected logic state of memory cell 105 may then be output through column decoder 135 as output 140. In some examples, a sense component 130 may include a collection of components (e.g., circuit elements) that may be repeated for each of a set of access lines 115 connected to the sense component 130. For example, a sense component 130 may include a separate sensing circuit (e.g., a separate sense amplifier, a separate signal development circuit) for each of a set of access lines 115 coupled with the sense component 130, such that a logic state may be separately detected for a respective memory cell 105 coupled with a respective one of the set of access lines 115. In various examples, a reference signal source or generated reference signal may be shared between components of the memory device 100 (e.g., shared among one or more sense components 130, shared among separate sensing circuits of a sense component 130).

The sense component 130 may be included in a device that includes the memory device 100. For example, the sense component 130 may be included with other read and write circuits, decoding circuits, or register circuits of the memory that may be coupled to the memory device 100. In some examples, the detected logic state of a memory cell 105 may be output through a column decoder 135 as an output. In some examples, a sense component 130 may be part of a column decoder 135 or a row decoder 125. In some examples, a sense component 130 may be connected to or otherwise in electronic communication with a column decoder 135 or a row decoder 125. Column decoder 135 may accept data, for example from input/output 140 to be written to the memory cells 105. Input/output 140 can be coupled to a host not shown in FIG. 1.

Although a single sense component 130 is shown, a memory device 100 may include more than one sense component 130. For example, a first sense component 130 may be coupled with a first subset of access lines 115 and a second sense component 130 may be coupled with a second subset of access lines 115 (e.g., different from the first subset of access lines 115). In some examples, such a division of sense components 130 may support parallel (e.g., simultaneous) operation of multiple sense components 130. In some examples, such a division of sense components 130 may support matching sense components 130 having different configurations or characteristics to particular subsets of the memory cells 105 of the memory device (e.g., supporting different types of memory cells 105, supporting different characteristics of subsets of memory cells 105, supporting different characteristics of subsets of access lines 115). Additionally or alternatively, two or more sense components 130 may be coupled with a same set of access lines 115 (e.g., for component redundancy). In some examples, such a configuration may support maintaining functionality to overcome a failure or otherwise poor operation of one of the redundant sense components 130. In some examples, such a configuration may support the ability to select one of the redundant sense components 130 for particular operational characteristics (e.g., as related to power consumption characteristics, as related to access speed characteristics for a particular sensing operation).

In ferroelectric memory architectures accessing the memory cell 105 may degrade or destroy the stored logic state and re-write or refresh operations may be performed to return the original logic state to memory cell 105. In DRAM or FeRAM, for example, a capacitor of a memory cell 105 may be partially or completely discharged during a sense operation, thereby corrupting the logic state that was stored in the memory cell 105. Thus, in some examples, the logic state stored in a memory cell 105 may be rewritten after an access operation. Further, activating a single access line 110 or 115 may result in the discharge of all memory cells 105 coupled with the access line 110 or 115. Thus, several or all memory cells 105 coupled with an access line 110 or 115 of an access operation (e.g., all cells of an accessed row, all cells of an accessed column) may be rewritten after the access operation.

A ferroelectric memory element (e.g., a ferroelectric capacitor) of a memory cell 105 may written by applying a voltage with a magnitude high enough to polarize the ferroelectric memory element (e.g., applying a saturation voltage) with a polarization associated with a desired logic state, and the ferroelectric memory element may be isolated (e.g., floating), or a zero net voltage may be applied across the ferroelectric memory element (e.g., grounding, virtually grounding the ferroelectric memory element).

Figure 2:
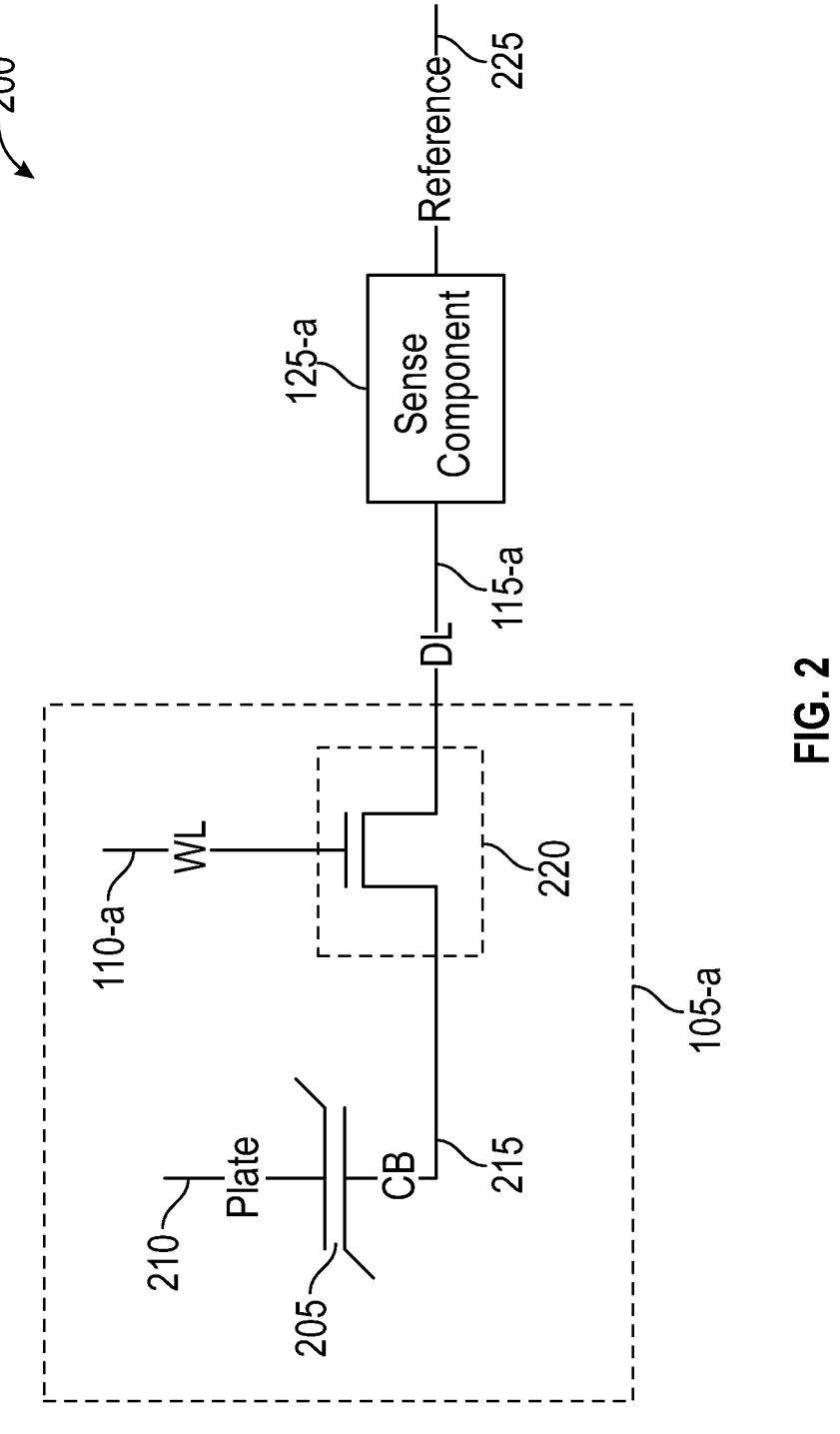
FIG. 2 illustrates an example circuit of a memory cell for supporting memory cell access in accordance with some examples of the present disclosure.

FIG. 2 illustrates an example circuit 200 for memory access in accordance with various embodiments of the present disclosure. Circuit 200 may include a ferroelectric memory cell 105-a, word line 110-a, digit line 115-a, and sense component 130-a, which may be examples of a memory cell 105, word line 110, digit line 115, and sense component 130, respectively, as described with reference to FIG. 1. Circuit 200 includes a logic storage component, such as capacitor 205 that includes two conductive terminals, cell plate 210 (Plate) and cell bottom 215 (CB). These terminals may be separated by an insulating ferroelectric material. As described above, various states may be stored by charging or discharging capacitor 205. The cell plate line 210 can correspond to the plate lines 120 (FIG. 1).

The stored state of capacitor 205 may be read or sensed by operating various elements represented in circuit 200. Capacitor 205 may be in electronic communication with digit line 115-a. Capacitor 205 may thus be isolated from the digit line 115-a when selection component 220 is deactivated, and capacitor 205 may be connected to digit line 115-a via selection component 220 when selection component 220 is activated. In some cases, selection component 220 may be a transistor and its operation may be controlled by applying a voltage to the transistor gate, where the voltage magnitude is greater than the threshold magnitude of the transistor. Word line 110-a may activate selection component 220; for example, a voltage applied to word line 110-a may be applied to the transistor gate, connecting capacitor 205 with digit line 115-a.

In the example depicted in FIG. 2, capacitor 205 is a ferroelectric capacitor. The change in stored charge depends on the initial state of capacitor 205, i.e., if the initial state stored a logic 1 or a logic 0. The change in stored charge may then be compared to a reference (e.g., a reference voltage) by sense component 130-a in order to determine the stored logic state in memory cell 105-a. To write memory cell 105-a, a voltage potential may be applied across capacitor 205. A voltage applied to capacitor 205 changes the charge of capacitor 205. The change in charge may be compared to a reference 225 (e.g., a reference voltage) by sense component 125-a in order to determine the stored logic state in memory cell 105-a.

Figure 3:
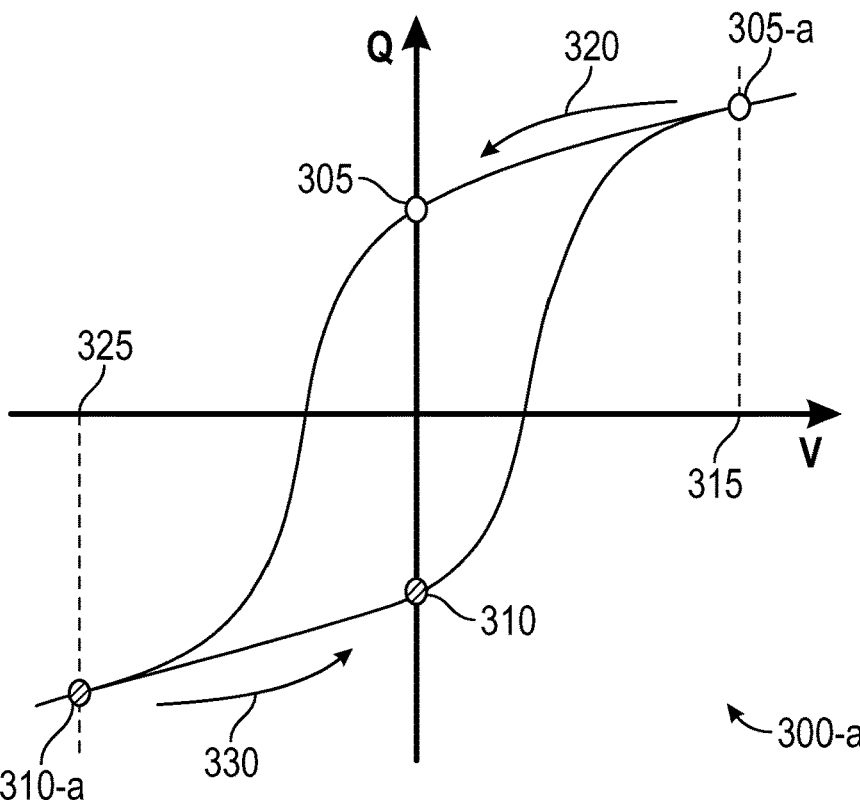
FIG. 3 illustrates examples of non-linear electrical properties with hysteresis plots for a ferroelectric memory cell sensing in accordance with examples of the present disclosure.
Figure 3:
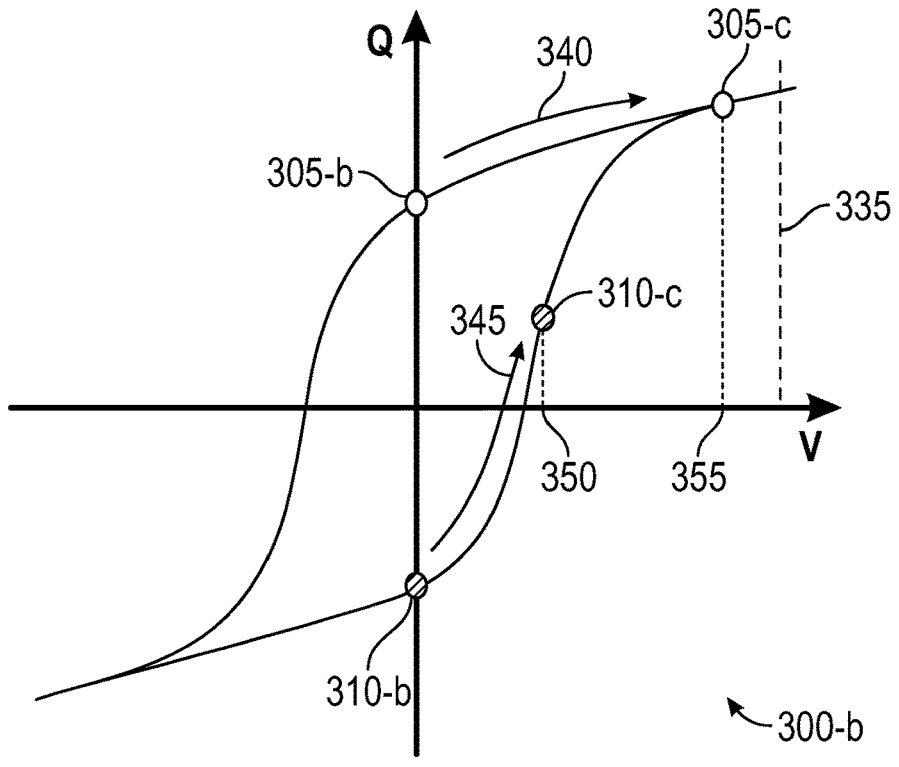

As discussed above, ferroelectric memory may require two pairs of operations to complete a read and write function. FIG. 3 illustrates examples of non-linear electrical properties with hysteresis plots for a ferroelectric memory cell sensing in accordance with examples of the present disclosure. Hysteresis curves 300-a and 300-b illustrate an example ferroelectric memory cell writing and reading process, respectively. Hysteresis curves 300 depict the charge, Q, stored on a ferroelectric capacitor as a function of a voltage difference, V.

A ferroelectric material is characterized by a spontaneous electric polarization, for example, it maintains a non-zero electric polarization in the absence of an electric field. Example ferroelectric materials include barium titanate (BaTiO3), lead titanate (PbTiO3), lead zirconium titanate (PZT), and strontium bismuth tantalate (SBT). The ferroelectric capacitors described herein may include these or other ferroelectric materials. Electric polarization within a ferroelectric capacitor results in a net charge at the ferroelectric material's surface and attracts opposite charge through the capacitor terminals. Thus, charge is stored at the interface of the ferroelectric material and the capacitor terminals. Because the electric polarization may be maintained in the absence of an externally applied electric field for relatively long times, even indefinitely, charge leakage may be significantly decreased as compared with, for example, capacitors employed in volatile memory arrays. This may reduce the need to perform refresh operations as described above for some volatile memory architectures.

Hysteresis curves 300 may be understood from the perspective of a single terminal of a capacitor. By way of example, if the ferroelectric material has a negative polarization, positive charge accumulates at the terminal. Likewise, if the ferroelectric material has a positive polarization, negative charge accumulates at the terminal. Additionally, it should be understood that the voltages in hysteresis curves 300 represent a voltage difference across the capacitor and are directional. For example, a positive voltage may be realized by applying a positive voltage to the terminal in question and maintaining the second terminal at ground (or approximately zero volts (0V)). A negative voltage may be applied by maintaining the terminal in question at ground and applying a positive voltage to the second terminal, for example, positive voltages may be applied to negatively polarize the terminal in question. Similarly, two positive voltages, two negative voltages, or any combination of positive and negative voltages may be applied to the appropriate capacitor terminals to generate the voltage difference shown in hysteresis curves 300.

As depicted in hysteresis curve 300-a, the ferroelectric material may maintain a positive or negative polarization with a zero-voltage difference, resulting in two possible charged states: charge state 305-a and charge state 310-a. According to the example of FIG. 3, charge state 305 represents a logic 0 and charge state 310 represents a logic 1. In some examples, the logic values of the respective charge states may be reversed without loss of understanding.

A logic 0 or 1 may be written to the memory cell by controlling the electric polarization of the ferroelectric material, and thus the charge on the capacitor terminals, by applying voltage. For example, applying a net positive voltage 315 across the capacitor results in charge accumulation until charge state 305-a is reached. Upon removing voltage 315, charge state 305-a follows path 320 until it reaches charge state 305 at zero voltage potential. Similarly, charge state 310 is written by applying a net negative voltage 325, which results in charge state 310-a. After removing negative voltage 325, charge state 310-a follows path 330 until it reaches charge state 310 at zero voltage. In some example aspects, after sensing, stored data in a cell is destroyed (e.g., written to "0" regardless of the original data). Accordingly, if a "0" is to be programmed into the cell, no further action is needed. However, if a "1" is to be programmed into the cell, then writing a "1" as described above may occur.

To read, or sense, the stored state of the ferroelectric capacitor, a voltage may be applied across the capacitor. In response, the stored charge changes, and the degree of the change depends on the initial charge state—i.e., the degree to which the stored charge of the capacitor changes varies depending on whether charge state 305-b or 310-b was initially stored. For example, hysteresis curve 300-b illustrates two possible stored charge states 305-b and 310-b. Net voltage 335 may be applied across the capacitor. Although depicted as a positive voltage, voltage 335 may be negative. In response to voltage 335, charge state 305-b may follow path 340. Likewise, if charge state 310-b was initially stored, then it follows path 345. The final position of charge state 305-c and charge state 310-c depend on a number of factors, including the specific sensing operation and circuitry.

In some cases, the final charge may depend on the intrinsic capacitance of the digit line of a memory cell. For example, if the capacitor is electrically connected to the digit line and voltage 335 is applied, the voltage of the digit line may rise due to its intrinsic capacitance. Therefore, a voltage measured at a sense component may not equal voltage 335 and instead may depend on the voltage of the digit line. The position of final charge states 305-c and 310-c on hysteresis curve 300-b may thus depend on the capacitance of the digit line and may be determined through a load-line analysis, i.e., charge states 305-c and 310-c may be defined with respect to the digit line capacitance. As a result, the voltage of the capacitor, voltage 350 or voltage 355, may be different and may depend on the initial state of the capacitor.

By comparing voltage 350 or voltage 355 to a reference voltage, the initial state of the capacitor may be determined. For example, the reference voltage may be an average of voltage 350 and 355 and, upon comparison, the sensed voltage may be determined to be higher or lower than the reference voltage. A value of the ferroelectric cell (i.e., a logic 0 or 1) may then be determined based on the comparison.

To reduce the amount of power consumed in sensing, reading and programming memory cells, plate size can be reduced to reduce the amount of power needed to ramp up a particular plate for sensing. Further, plates can be configured to not be shared between different column groups, so that only the plates needed for sensing, programming or reading from a column need to be activated. Furthermore, extra memory cells (referred to hereinafter as redundant memory cells) can be provided in rows or columns to map into a memory array to replace defective or nonconforming cells, and the redundant memory cells can be configured into similar power saving architectures. When defects are detected in columns, rows, or units, configurations or groups of memory cells, the redundant cells can be "swapped" with defective columns, rows, etc.

Figure 4:
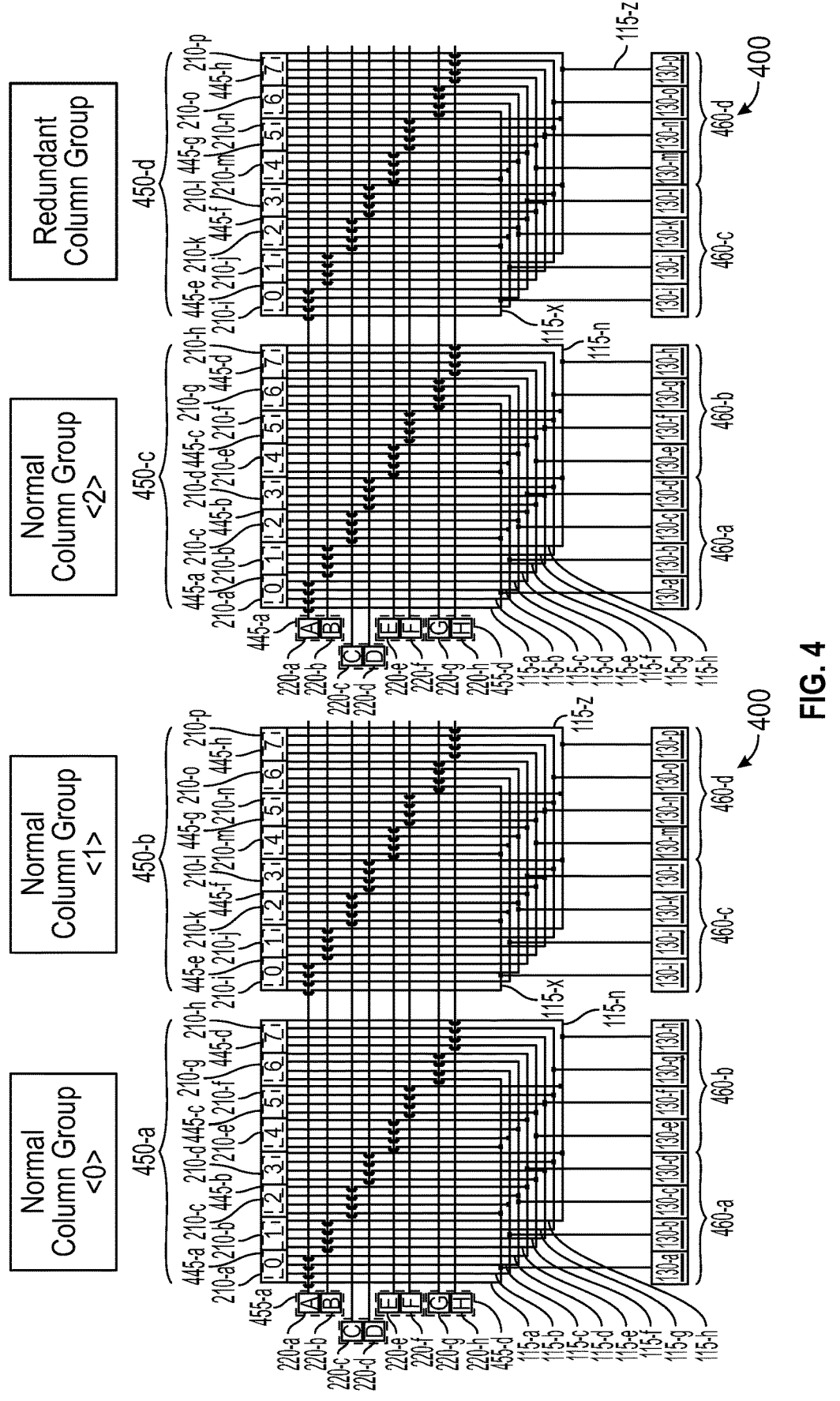
FIG. 4 illustrates an example of a memory array having column groups and a redundant column group having components that support selection of and operations relating to one or more cell plates in accordance with some examples of the present disclosure.

FIG. 4 illustrates an example of a memory array 400 having column groups and redundant column groups having components that support selection of and operations relating to one or more cell plates in accordance with some examples of the present disclosure. Array 400 may include a ferroelectric memory cell, one or more word lines (not shown for simplicity), digit lines (e.g., 115-*a* to 115-*h*, 115-*n*, 115-*x* to 115-*z*, etc.), sense components (e.g., 130-*a* to 130-*p*, plates (e.g., 210-*a* to 210-*p*), and/or selection components (e.g., 220-*a* to 220-*h*), which may be examples of a memory cell 105, word line 110, digit line 115, sense component 130, plates 210, and selection component 220, respectively, as described with reference to FIGS. 1, 2, or others. Array 400 may include a logic storage component, such as a capacitor (e.g., capacitor 205 discussed with reference to FIG. 2), which may include conductive terminals, including plate 210 and cell bottom 215 (also discussed with reference to FIG. 2). These terminals may be separated by an insulating ferroelectric material. As described above, various states may be stored by charging or discharging capacitor 205.

In accordance with various embodiments of the present disclosure, additional elements are contemplated, although each may not be explicitly labeled or shown. For example, in addition to selection component pair 455-*a* (relating to selection component 220-*a* and selection component 220-*b*) and selection component pair 455-*d* (relating to selection component 220-*g* and selection component 220-*h*), array 400 may include additional components or selection component pairs, or both, among other features. As another example, array 400 may include four digit lines, or another number of digit lines per plate (e.g., plate 210-*a*), that may be distinct and be separately identified, while only some of the digit lines shown are explicitly labeled (e.g., 115-*a* to 115-*h*, 115-*n*, and 115-*x* to 115-*z*, etc.). Such distinct digit lines may enable access of multiple memory cells associated with a single plate 210.

Array 400 may also include plate pairs 445-*a* to 445-*p*, that relate to two or more examples of plates 210 (e.g., 210-*a* and 210-*b*). In some embodiments, plate pairs 445-*a* to 445-*p* may fall within one or more column groups 450, such as column group 450-*a* through 450-*d*, as shown in FIG. 4. A redundant column group 450-*d* can be provided for swapping with any defective column group. Array 400 may also include selection component pairs 455-*a* to 455-*d*, that relate two selection components 220 (e.g., 220-*a* and 220-*b*). Array 400 may also include sense component groups (e.g., 460-*a* to 460-*d*), that relate one or more sense components 130 (e.g., 130-*a* to 130-*d*).

In some embodiments, array 400 includes eight sense components 130 for each column group (e.g., column group 450-*a*), with each sense component 130 in electronic communication with one or more digit lines (e.g., digit line 115-*a*, digit line 115-*b*) relating to one or more plates (e.g., plate 210-*a*, plate 210-*b*). In other embodiments, array 400 includes more than or fewer than eight sense components 130 for each column group (e.g., column group 450-*a*, column group 450-*b*).

As previously noted, while the discussion of sensing processes herein describes groups having eight plates, other group sizes are possible, such as groups with two or four plates. In this case, there may be commensurately more or fewer word lines, digit lines, plate lines, sense components (e.g., sense amplifiers) etc. associated with the plates in a group, relative to those depicted in FIG. 4.

In some embodiments, array 400 and the associated techniques may be used for vertical cut plates (e.g., plate 210-*a*, plate 210-*b*) that may be used in FeRAM or other RAM designs (e.g., resistive RAM such as CBRAM). In some embodiments, based on identifying a short circuit or other electric current relationships, plate pair 445-*a* may be selected. This selecting of plates 210-*a* and 210-*b* may be accompanied by selecting a selection component pair 455-*a* that selects selection component 220-*a* and 220-*b*, as an example. By selecting plates 210-*a* and 210-*b* and selection components 220-*a* and 220-*b* (and corresponding word and digit lines (e.g., 115-*a* to 115-*h*)), each of sense components 130-*a* to 130-*h* may be appropriately populated with data, and sense component groups 460-*a* and 460-*b* may be fully populated to allow for read, write, or other operations.

In some embodiments, based on identifying an electric current relationship between plates 210-*a* and 210-*b* (as one example) within a first column group 450-*a*, one or more other plate pairs (e.g., 445-*b*, 455-*c*) may be selected. For example, selecting plates 210-*g* and 210-*h* may be accompanied by selecting a selection component pair 455-*d* that selects selection components 220-*g* and 220-*h*. By selecting plates 210-*g* and 210-*h* and selection components 220-*g* and 220-*h* (and corresponding word and digit lines, each of sensing components 130 corresponding to the digit lines 115 may be appropriately populated with data and the sense component group 460 may be fully populated to allow for read, write, or other operations.

In some embodiments, one set of selection components 220 (among other components or elements) may be in electronic communication with or relate to multiple column groups 450, plates 210, or other sets of memory components. For example, one set of selection components 220 (e.g., selection components 220-*a* to 220-*h*) may facilitate or perform selection of one or more plates 210 related to one or more column groups 450 (e.g., column group 450-*a*, column group 450-*b*).

Additionally or alternatively, one or more other sets of selection components 220 (among other components or elements) may be in electronic communication with or relate to multiple column groups 450, plates 210, and/or other sets of memory components. As an example, one set of selection components 220 (e.g., selection components 220-*a* to 220-*h*) may facilitate or perform selection of one or more plates related to one column group 450 (e.g., column group 450-*a*) and another set of selection components 220 may facilitate and/or perform selection of one or more plates 210 related to one column group 450 (e.g., column group 450-*b*).

In some embodiments, the array 400 may include plate pairs (e.g., 445-*a*, 445-*b*, 445-*c*, 445-*d*), that fall within the same column group 450-*a* and may be selected based on an electric current relationship between plates 210 within the column group 450-*a*.

In some embodiments, the array 400 may include plate pairs 445 (e.g., 445-*e*, 445-*f*, 445-*g*, 445-*h*), that fall within another column group 450-*b* and may be selected based on an electric current relationship between plates within another column group 450, such as column group 450-*a*. This selection may be based on multiple factors, including the granularity of the selection, the determination, the identification, or the array, as discussed below.

For example, in some embodiments, an element of array 400 (or some related component or element discussed in other figures, such as memory controller 150) may be configured to select the column groups 450 shown in FIG. 4 based on an electric current relationship between plates 210-*a* and 210-*b*. Based on determining (via a read or write operation or monitoring performance of one or more plates) or identifying the electric current relationship, one or more elements (e.g., a fuse) associated with groups of column groups may initiate or be related to the selection of the plate pairs (e.g., 445-*a* to 445-*h*, etc.). In some embodiments, the number of elements or components facilitating selection of the plates/or plate pairs may be minimal and may be based on projected or known design parameters (including, for example, one or more known electric current relationships between plates).

For example, in some embodiments, a die may include one element facilitating selection of the plates (e.g., one fuse) to provide the desired selection and pairing capabilities relating to various techniques or methods. In such cases, when the one fuse is triggered, then one plate pair, multiple plate pairs, every plate in a page, every plate in a section, or every plate on the die may be grouped into a plate pair based on one or more identified or determined electric current relationships.

In some embodiments, the selection may apply only to the plates in the same column group, in adjacent column groups, and/or some other structure of a larger memory sample (e.g., one or more dies, banks, subsets of one or more banks, half banks, pages, sections, half sections, and/or subsets of one or more banks, groups, pages, sections, etc.). For example, in some embodiments, each section may include one set of fuses (and/or some other element and/or component) per section (with hundreds of sections on a memory chip), which would allow for many more defects and/or electric current relationships on a memory chip and which would also allow for more granular adjustment and/or selection by section (and/or a bank that includes multiple sections) based on the designed granularity. In some embodiments, the selected granularity and associated fuse(s)/fuse sets may be based on actually identifying or determining an amount of and/or a location of one or more defects (e.g., electric current relationships). In other embodiments, the selected granularity and associated fuses/fuse sets may be based on projected, expected, and/or calculated to identify or determine of an amount of and/or a location of one or more defects (e.g., electric current relationships), based on past yield, design parameters, required robustness, some combination, and/or other factors and/or parameters.

In some embodiments, based on a fuse being triggered, every plate within a larger page size (relative to a page size associated with a memory access command) may be selected or every plate within a section may be selected. In some embodiments, for multi-deck memory devices, a single fuse associated with a section may be shared by multiple decks, such that a fuse that is triggered based on the detection of a short in a first section of a first deck may affect selection of plates in the first section of a second deck. In other cases, each deck may have an independent set of fuses, such as one fuse per section per deck.

In some embodiments, a redundant column group 450-*d* is provided. When defects are detected in one of the other column groups 450-*a*, 450-*b*, or 450-*c*, the defective column group 45-*a*, 450-*b*, or 450-*c* can be replaced with the redundant column group 450-*d*.

It will be appreciated that plates are not shared between the different column groups 450, and accordingly power can be provided to plates separately for each column group. When defects are encountered in a column group, reading and writing operations can be suppressed to that column group and plates corresponding to that particular column group may be left unactivated.

Figure 5A:
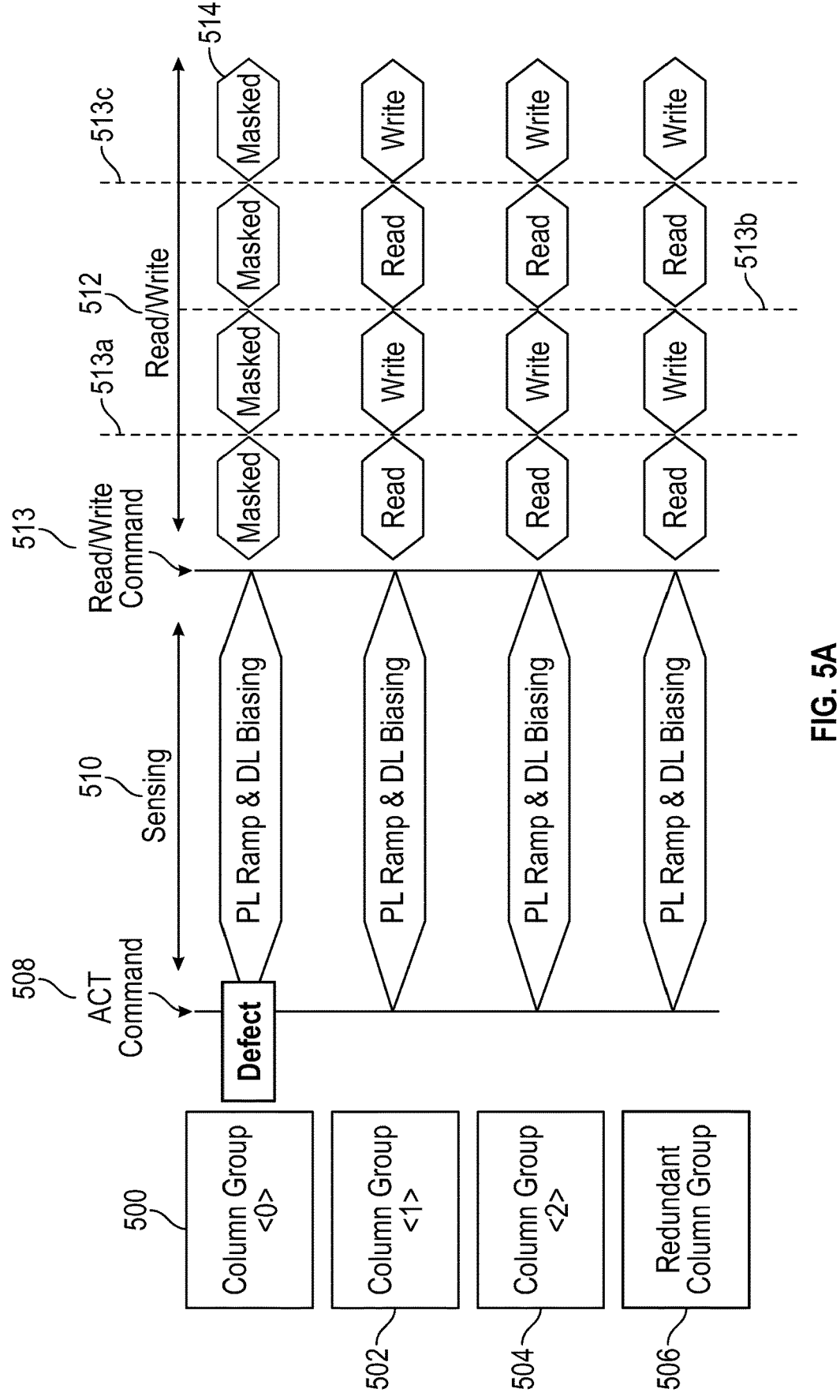
FIG. 5A illustrates column group sensing and memory access for a set of column groups that include a redundant column group wherein one column group of the set includes defects for purposes of comparison with some examples of the present disclosure.
Figure 5B:
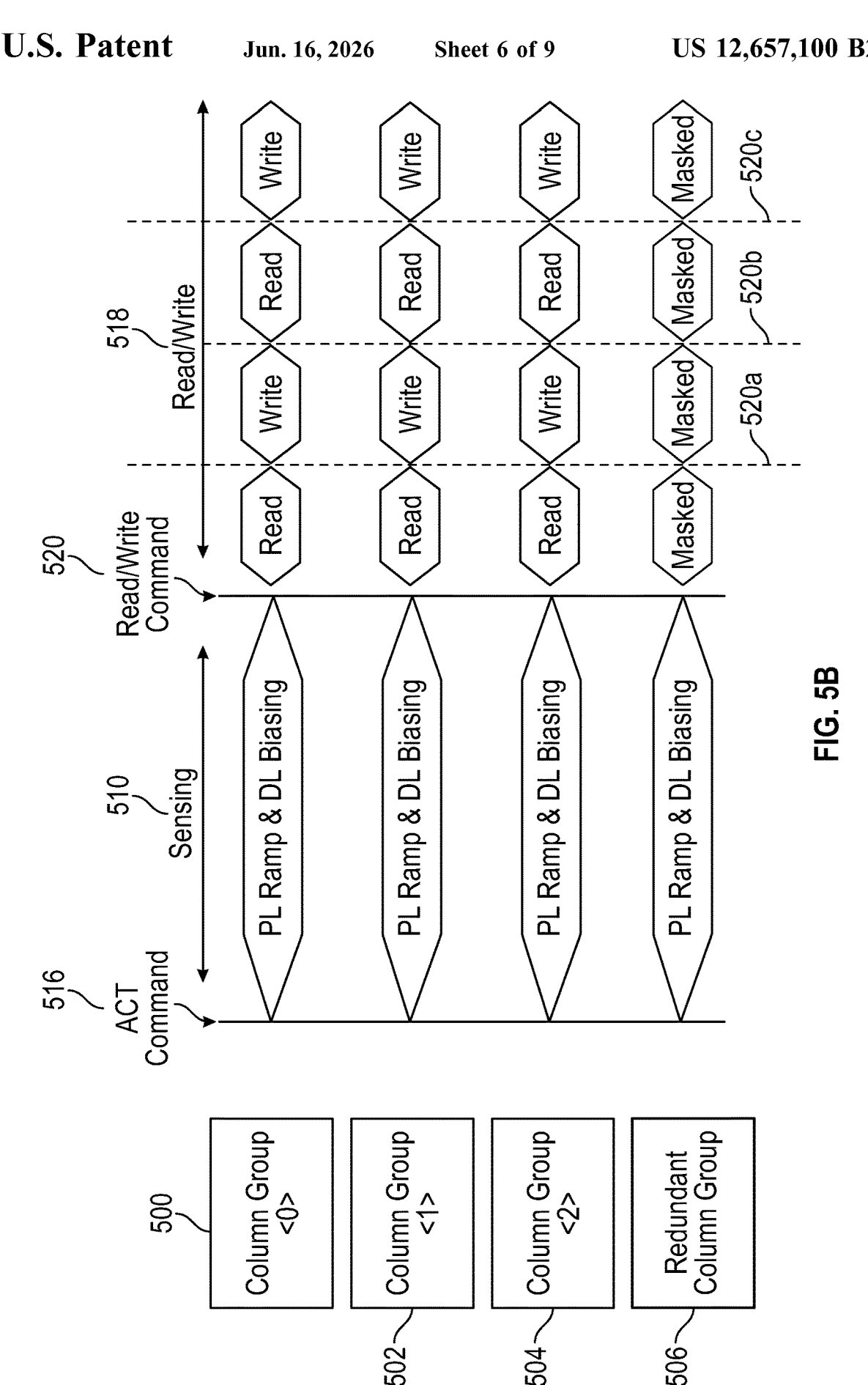
FIG. 5B illustrates column group sensing and memory access for a set of column groups that include a redundant column group wherein the set does not include defects for purposes of comparison with some examples of the present disclosure.

FIG. 5A illustrates column group sensing and memory access for a set of column groups that include a redundant column group wherein one column group of the set includes defects for purposes of comparison with some examples of the present disclosure. FIG. 5B illustrates column group sensing and memory access for a set of column groups that include a redundant column group wherein the set does not include defects for purposes of comparison with some examples of the present disclosure.

Referring to FIG. 5A, column groups 500, 502, 504 may be available for reading and writing operations. While three column groups 500, 502, 504 are shown, examples are not limited thereto and the column groups 500, 502, and 504 are shown for illustration purposes only. A redundant column group 506 is also provided. Upon receiving an access command 508, in an example, a defect can be detected in, e.g., column group 500 during a sensing phase 510. The sensing phase 510 is performed on all column groups 500, 502, 504, and 506 despite there being a detected defect in column group 500. For example, plate line ramping and digit line biasing can occur (as described above with reference to, for example, FIG. 3) during sensing operations in preparing for reading/writing phase 512 subsequent to receiving a read/write command 513. Defective column groups are not disabled (or ignored) until the reading/writing phase 512. At point 514, defective columns groups are "masked" so that no reading or writing will occur for the masked column group 500. Subsequent read operations and write operations can occur at 513*a*, 513*b*, and 513*c*, for example. While four read and write commands are shown, embodiments are not limited thereto.

In the context of embodiments and in available systems, "masking" causes read data from bad columns (e.g., columns found to have physical errors or other errors that prevent accurate read and write operations) to be invalid and ignored. Instead, the read data from redundant column group 506 can be used as read data in the place of data columns found to be bad (in the example, column 500 may be found to have errors and accordingly the data is masked). Similarly, for write operations, data that would otherwise be written to a column having errors is instead written to redundant column group 506 using data steering. Whether the operation in question is a read or write operation, the use of the redundant column will not be detected by the user.

Referring to FIG. 5B, upon receiving an access command 516, in an example, no defects are detected in the column groups 500, 502, 504, 506. A sensing phase 510 is performed on all column groups 500, 502, 504, and 506 despite there being no need to read from redundant column group 506. For example, plate line ramping and digit line biasing can occur (as described above with reference to, for example, FIG. 3) during sensing operations in preparing for reading/writing phase 518 subsequent to read/write command 520 and subsequent read/write commands 520*a*, 520*b*, and 520*c*. The redundant column group 506 can be disabled/masked, for example, at the onset of the reading/writing phase 518.

Available systems therefore may unnecessarily consume power during sensing operations of memory cells (e.g., column groups or other subsets and combinations of addressable memory cells) that are defective. In addition, even when defects are not present in a memory array, available systems may unnecessarily consume power during sensing operations for redundant cells that are not being used, and which will not be read or written to, because of the lack of defects.

Aspects of the present disclosure address these and other concerns by masking (e.g., disabling) either defective column groups or redundant column groups earlier in the process. For example, a column group can be disabled before sensing, thereby avoiding ramping plate lines or biasing digit lines, and reducing power consumption and reducing or eliminating power waste.

Figure 6A:
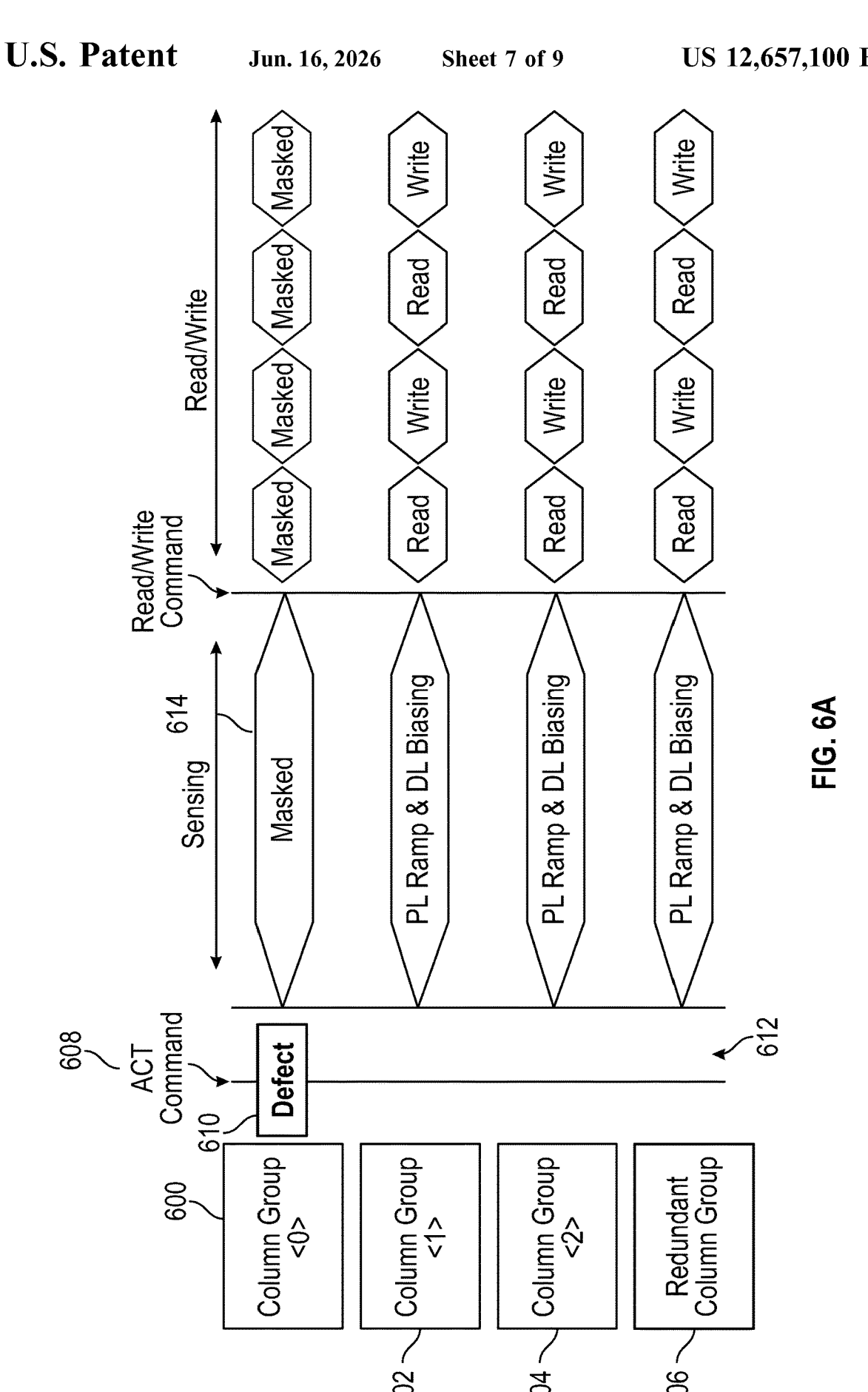
FIG. 6A illustrates column group sensing and memory access in memory in which defects have been detected in accordance with examples of the present disclosure.

FIG. 6A illustrates column group sensing and memory access in memory in which defects have been detected in accordance with examples of the present disclosure. Systems and memory devices for implementing the concepts of FIG. 6A can include an array of memory cells comprised of a plurality of column groups 600, 602, 604 of memory cells. While column groups are described, other combinations, groups or quantities of memory cells can be used to implement example embodiments, with design or limitations based on the type of memory included in the relevant memory device. The plurality of column groups can include at least one column redundant group 606 for repairing a defective column group.

An access command can be provided at operation 608. The access command can be provided by a host device. At operation 608, a memory controller (e.g., memory controller 150 (FIG. 1)) can detect whether a defective column group is present within the plurality of groups 600, 602, 604, 606. In the illustrated example, a defect 610 was detected at column group 600. A time delay 612 can be provided after operation 608 to perform functions associated with example embodiments (e.g., detecting defects, configuring and loading redundancy information to read/write circuitry, loading redundancy information to sense amplifiers and plate control circuitry, etc.). For example, if a defect is present within the plurality of groups 600, 602, 604, then memory controller 150 can refrain from sensing operations within the defective column group (e.g., group 600 in the illustrated example). In examples, refraining from sensing operations can include refraining from ramping power or inhibiting providing power to the corresponding plate line for the column group 600 at e.g., operation 614. Similar masking can be performed to prevent reading and writing to the column group 600.

Figure 6B:
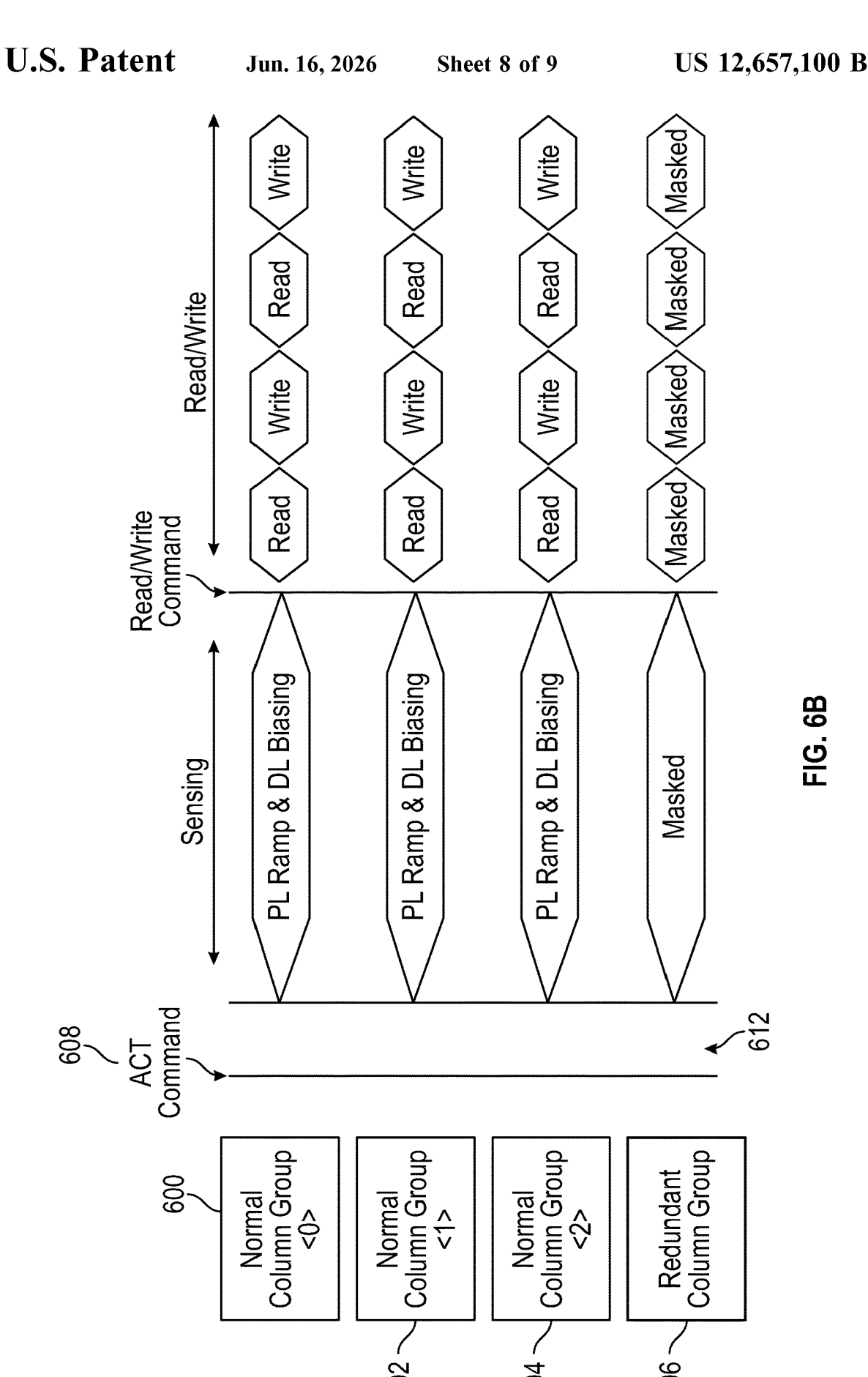
FIG. 6B illustrates column group sensing and memory access in memory that does not include defects in accordance with some examples of the present disclosure.

If no defects are found in the column groups 600, 602, 604 at the time of receiving access command 608, as seen at FIG. 6B, then the memory controller 150 can refrain from performing sensing operations using the redundant group 606. If no defect was detected, then redundancy swapping will not occur to replace a defective column group with the redundant column group 606. Therefore, providing power for the redundant column group (e.g., ramping plate lines, biasing digit lines, etc.) is not necessary and would increase power usage and power waste. Systems and devices according to embodiments, therefore, do not provide power to the redundant column unless defects are detected in the other columns.

Figure 7:
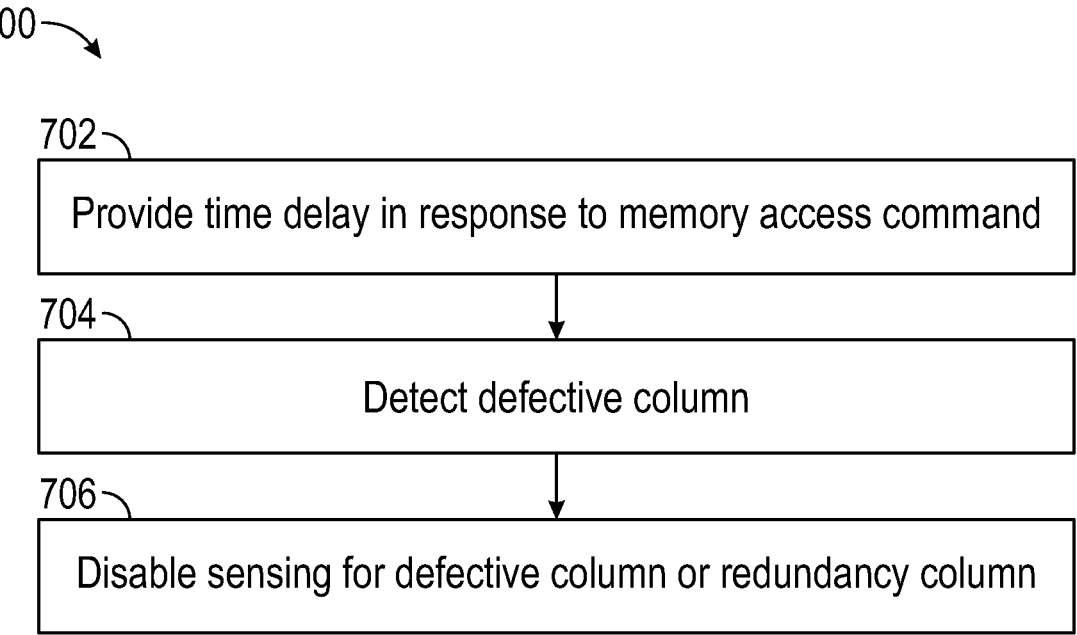
FIG. 7 illustrates a flow diagram that supports memory cell sensing in accordance with aspects of the present disclosure.

FIG. 7 illustrates a method 700 for accessing memory. The method 700 can be performed by components described above with reference to FIG. 1 and FIG. 2. For example, some operations can be performed by a memory controller 150, sense component 130, with respect to WL 110, PL 120, and DL 115 of memory cell 105.

The method 700 can begin with operation 702 by providing a time delay in response to memory access commands. With reference to FIG. 6A and FIG. 6B, this time delay can be equated to time delay 612.

The method 700 can continue with operation 704 wherein defects are detected within one or more column groups of an array of memory. In operation 706, if no defects are detected, then the redundant column group can be masked. When the redundant column group is masked, for example, sensing will not be performed on the redundant column group, thereby providing power savings as described earlier herein. Otherwise, if defects are detected, the column having the defects will be masked, and sensing and access operations will not be performed for that defective column.

By not providing sensing in either the defective columns or a redundant column (if no defects are found), in accordance with embodiments, power savings can be achieved in memory devices and apparatuses.

ADDITIONAL NOTES AND EXAMPLES

Example 1 is a memory device comprising: an array of memory cells comprising a plurality of groups of memory cells, the plurality of groups including at least one redundant group for repairing a defective group; and a controller coupled to the array, wherein the controller is configured to: responsive to receiving a memory access command, detect whether a defective group is present in the plurality of groups; when a defective group is detected in the plurality of groups, inhibit sensing operations for the defective group; and when a defective group is not detected in the plurality of groups, inhibit sensing operations for the redundant group.

In Example 2, the subject matter of Example 1 can optionally include wherein the sensing operations include ramping up power to a respective plate line coupled to each respective group and providing a biasing voltage to a respective second access line for each respective group.

In Example 3, the subject matter of Example 2 can optionally include wherein the groups comprise column groups and wherein each of the plurality of groups is each coupled to a separate plate line.

In Example 4, the subject matter of any of Examples 1-3 can optionally include wherein the controller is configured to provide a time delay upon receiving the memory access command and before initiating sensing operations.

In Example 5, the subject matter of Example 4 can optionally include wherein the controller is configured to load redundancy information to read circuitry during the time delay.

In Example 6, the subject matter of Example 4 can optionally include wherein the controller is configured to load redundancy information to sense amplifier and plate control circuitry during the time delay.

In Example 7, the subject matter of any of Examples 1-6 can optionally include wherein the controller is configured to mask the defective group upon receiving a read command or a write command.

In Example 8, the subject matter of any of Examples 1-7 can optionally include wherein the controller is configured to mask the redundant group upon receiving a read command or a write command when no defect is detected within the plurality of groups.

In Example 9, the subject matter of any of Examples 1-8 can optionally include wherein the array comprises ferroelectric RAM (FeRAM).

Example 10 is a method for accessing memory, the method comprising: receiving a memory access command to access groups within an array of memory, the groups including at least one redundant group; detecting whether a defective group is present within the groups; when a defective group is detected, inhibit sensing operations for the defective group; when a defective group is not detected, inhibit sensing operations for the at least one redundant group.

In Example 11, the subject matter of Example 10 can optionally include wherein the sensing operations include ramping up power to a respective plate line coupled to each respective group and providing a biasing voltage to a respective second access line for each respective group.

In Example 12, the subject matter of any of Examples 10-11 can optionally include providing a time delay upon receiving the memory access command and before initiating sensing operations.

In Example 13, the subject matter of Example 12 can optionally include loading redundancy information to read circuitry during the time delay.

In Example 14, the subject matter of Example 12 can optionally include loading redundancy information to sense amplifier and plate control circuitry during the time delay.

In Example 15, the subject matter of any of Examples 10-14 can optionally include masking the defective group upon receiving a read command or a write command.

In Example 16, the subject matter of any of Examples 10-15 can optionally include masking the redundant group upon receiving a read command or a write command if no defect is present within the array.

Example 17 is a system comprising: a host device; and a memory device coupled to the host device, the memory device comprising: an array of memory cells comprising a plurality of groups of memory cells, the plurality of groups including at least one redundant group for repairing a defective group; and a controller coupled to the array and configured to: responsive to a memory access command, detect whether a defective group is present in the plurality of groups; when a defective group is detected in the plurality of groups, inhibit sensing operations for the defective group; and when a defective group is not detected in the plurality of groups, inhibit sensing operations for the redundant group.

In Example 18, the subject matter of Example 17 can optionally include wherein the sensing operations include ramping up power to a respective plate line coupled to each respective group and providing a biasing voltage to a respective second access line for each respective group.

In Example 19, the subject matter of Example 18 can optionally include wherein the groups comprise column groups and wherein each of the plurality of groups are each coupled to a separate plate line.

In Example 20, the subject matter of any of Examples 17-19 can optionally include wherein the controller is configured to provide a time delay upon receiving the memory access command and before initiating sensing operations.

In Example 21, the subject matter of Example 20 can optionally include wherein the controller is configured to load redundancy information to read circuitry during the time delay.

In Example 22, the subject matter of Example 20 can optionally include wherein the controller is configured to load redundancy information to sense amplifier and plate control circuitry during the time delay.

In Example 23, the subject matter of any of Examples 17-22 can optionally include wherein the memory device includes a dynamic random-access memory (DRAM) device.

In Example 24, the subject matter of any of Examples 17-23 can optionally include wherein the memory device includes a ferroelectric random access memory (FeRAM) device.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect," "some aspects," "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. A memory device comprising:
an array of memory cells comprising a plurality of groups of memory cells, the plurality of groups including at least one redundant group for repairing a defective group, and each group is coupled to a respective independently-controlled plate line; and
a controller coupled to the array, wherein the controller is configured to:
responsive to receiving a memory access command, detect whether a defective group is present in the plurality of groups;
when a defective group is detected in the plurality of groups, inhibit sensing operations for the defective group; and
when a defective group is not detected in the plurality of groups, inhibit sensing operations for the redundant group;
wherein the sensing operations include powering respective plate lines for the respective groups.

2. The memory device of claim 1, wherein the sensing operations include ramping up power to a respective plate line coupled to each respective group and providing a biasing voltage to a respective second access line for each respective group.

3. The memory device of claim 1, wherein the controller is configured to provide a time delay upon receiving the memory access command and before initiating sensing operations.

4. The memory device of claim 1, wherein the controller is configured to mask the defective group upon receiving a read command or a write command.

5. The memory device of claim 1, wherein the controller is configured to mask the redundant group upon receiving a read command or a write command when no defect is detected within the plurality of groups.

6. The memory device of claim 1, wherein the array comprises ferroelectric RAM (FeRAM).

7. The memory device of claim 2, wherein the groups comprise column groups and wherein each of the plurality of groups is each coupled to a separate plate line.

8. The memory device of claim 3, wherein the controller is configured to load redundancy information to sense amplifier and plate control circuitry during the time delay.

9. A method for accessing memory, the method comprising:
receiving a memory access command to access groups within an array of memory, the groups including at least one redundant group;
detecting whether a defective group is present within the groups;
when a defective group is detected, inhibit sensing operations for the defective group;
when a defective group is not detected, inhibit sensing operations for the at least one redundant group;

wherein the sensing operations include providing power to respective plate lines for each of the respective groups.

10. The method of claim 9, wherein the sensing operations include ramping up power to a respective plate line coupled to each respective group and providing a biasing voltage to a respective second access line for each respective group.

11. The method of claim 9, comprising providing a time delay upon receiving the memory access command and before initiating sensing operations.

12. The method of claim 9, comprising masking the defective group upon receiving a read command or a write command.

13. The method of claim 11, comprising loading redundancy information to read circuitry during the time delay.

14. The method of claim 9, comprising masking the redundant group upon receiving a read command or a write command if no defect is present within the array.

15. A system comprising:

a host device; and a memory device coupled to the host device, the memory device comprising:

an array of memory cells comprising a plurality of groups of memory cells, the plurality of groups including at least one redundant group for repairing a defective group, and each group is coupled to a respective independently-controlled plate line; and a controller coupled to the array and configured to:

responsive to a memory access command, detect whether a defective group is present in the plurality of groups;

when a defective group is detected in the plurality of groups, inhibit sensing operations for the defective group; and when a defective group is not detected in the plurality of groups, inhibit sensing operations for the redundant group;

wherein the sensing operations include powering respective plate lines for the respective groups.

16. The system of claim 15, wherein the sensing operations include ramping up power to a respective plate line coupled to each respective group and providing a biasing voltage to a respective second access line for each respective group.

17. The system of claim 15, wherein the controller is configured to provide a time delay upon receiving the memory access command and before initiating sensing operations.

18. The system of claim 15, wherein the memory device includes a ferroelectric random access memory (FeRAM) device.

19. The system of claim 16, wherein the groups comprise column groups and wherein each of the plurality of groups are each coupled to a separate plate line.

20. The system of claim 17, wherein the controller is configured to load redundancy information to read circuitry during the time delay.

* * * * *